United States Patent [19]
Bryant et al.

[11] Patent Number: 6,065,585
[45] Date of Patent: May 23, 2000

[54] RESERVOIR SYSTEM FOR ROD-LIKE ARTICLES

[75] Inventors: Leonard James Bryant; Peter Alec Clarke; Kerry Hierons, all of Bucks; Neil Thorp, Didcot; Robert Howard Taylor, Bucks, all of United Kingdom

[73] Assignee: Molins PLC, Milton Keynes, United Kingdom

[21] Appl. No.: 09/190,004

[22] Filed: Nov. 12, 1998

Related U.S. Application Data

[63] Continuation of application No. 08/571,238, Dec. 12, 1995, Pat. No. 5,845,758.

[30] Foreign Application Priority Data

| Dec. 12, 1994 | [GB] | United Kingdom | 9425157 |
| May 30, 1995 | [GB] | United Kingdom | 9510918 |
| Nov. 27, 1995 | [GB] | United Kingdom | 9524179 |

[51] Int. Cl.$^7$ .................................................. B65G 21/18
[52] U.S. Cl. ........................ 198/347.1; 198/778; 198/812
[58] Field of Search ............................ 198/347.1, 347.4, 198/812, 778

[56] References Cited

U.S. PATENT DOCUMENTS

| 4,149,545 | 4/1979 | Hall . | |
| 4,299,322 | 11/1981 | Greenhead et al. | 198/778 |
| 4,323,624 | 4/1982 | Molins et al. . | |
| 4,448,301 | 5/1984 | Alger | 198/778 |
| 4,503,965 | 3/1985 | Applegate et al. . | |
| 4,653,631 | 3/1987 | Heybourn et al. | 198/778 |
| 4,690,604 | 9/1987 | Calverley et al. . | |
| 4,751,999 | 6/1988 | Opperthauser | 198/778 |
| 4,790,422 | 12/1988 | Clarke et al. . | |
| 4,872,543 | 10/1989 | Hinchcliffe . | |
| 4,892,453 | 6/1990 | Bantien et al. . | |
| 4,962,840 | 10/1990 | Miura et al. . | |
| 5,361,888 | 11/1994 | Brown et al. | 198/778 |
| 5,413,213 | 5/1995 | Golz et al. | 198/812 |
| 5,439,092 | 8/1995 | Hierons . | |
| 5,478,184 | 12/1995 | Bryant et al. . | |
| 5,845,758 | 12/1998 | Bryant et al. | 198/347.3 |
| 5,845,765 | 12/1998 | Gram | 198/778 |

FOREIGN PATENT DOCUMENTS

| 0 581 143 A1 | 5/1994 | European Pat. Off. . |
| 1299174 | 12/1972 | United Kingdom . |
| 1301843 | 1/1973 | United Kingdom . |
| 2 133 759 | 8/1984 | United Kingdom . |
| 2 263 680 | 8/1993 | United Kingdom . |
| WO 97/19605 | 6/1997 | WIPO . |

*Primary Examiner*—Gregory A. Morse
*Attorney, Agent, or Firm*—Antonelli, Terry, Stout & Kraus, LLP

[57] ABSTRACT

A reservoir system for rod-like articles such as cigarettes has a first-in, first out buffer conveyor with a variable capacity. The capacity of the reservoir is varied by moving a pair of guidestoward or away from each other. The guides support the conveyor belt in a spiral fashion from a lower input level to a higher output level to compensate for temporary fiddefences in flow rates.

19 Claims, 6 Drawing Sheets

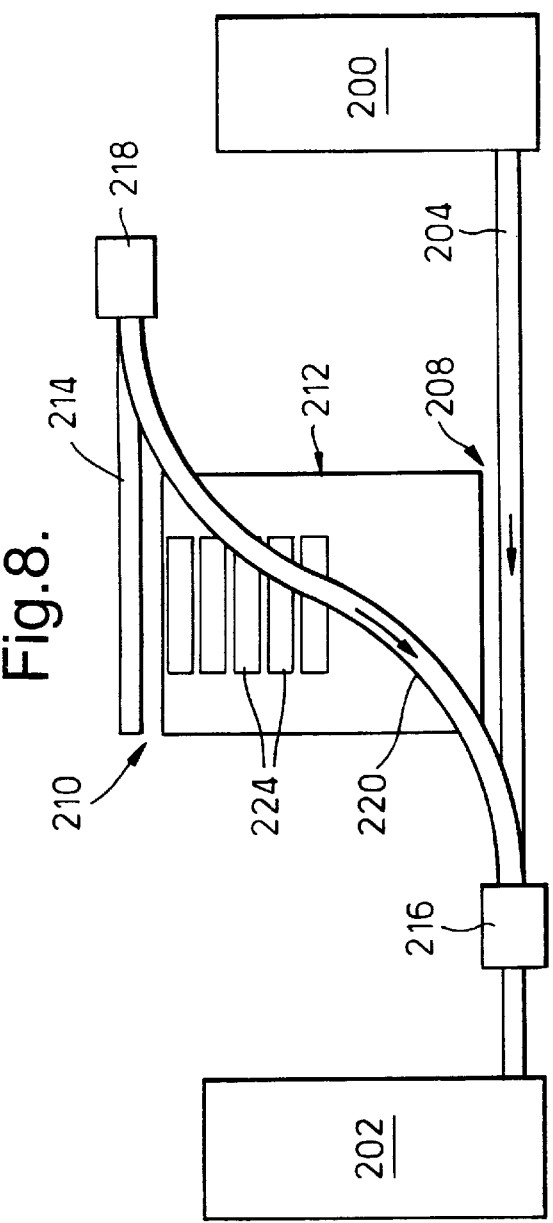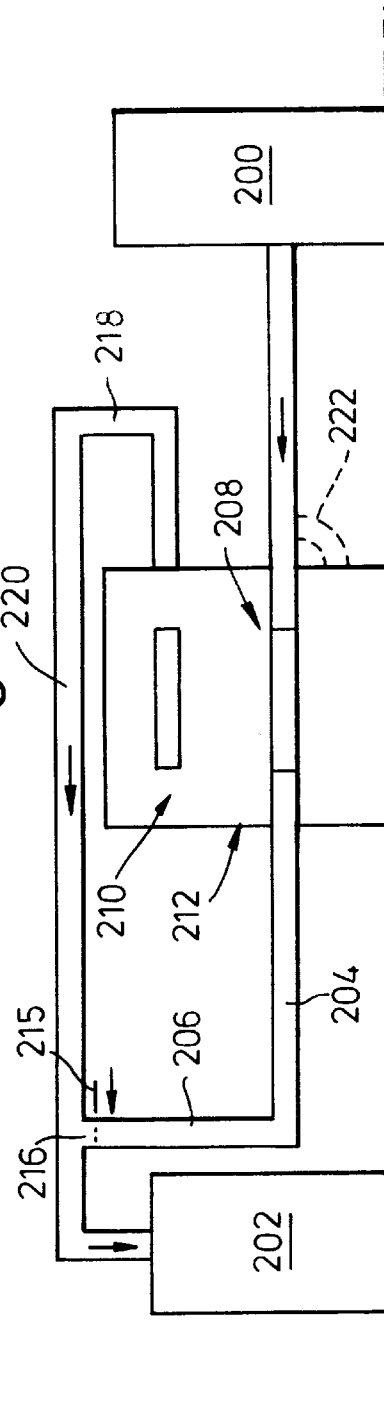

RESERVOIR SYSTEM FOR ROD-LIKE ARTICLES

CROSS-REFERENCE TO RELATED APPLICATION

This application is a continuation of our U.S. application Ser. No. 08/571,238, filed on Dec. 12, 1995, now U.S. Pat. No. 5,845,758, issued on Dec. 8, 1998.

BACKGROUND OF THE INVENTION

This invention relates to reservoir systems for rod-like articles, particularly articles of the tobacco industry such as cigarettes or filter rods.

In the manufacture of articles of the tobacco industry it is common to transport the articles directly from a delivery device such as a producing machine to a receiving device such as a packing machine, with the articles being conveyed in the form of a continuous multi-layer stream of articles moving in a direction transverse to the lengths of the articles. Typically such streams are 90–100 mm in height. It is known to provide a buffer reservoir for accommodating temporary or longer term differences in the rates of operation of the delivery and receiving devices, such reservoirs often taking the form of conveyor means supporting a variable length multi-layer stream of articles which is moved towards or away from a junction with a similar stream passing directly from the delivery device to the receiving device. Such buffer reservoirs may comprise reversible conveyors provided with an end wall or the like for bounding the leading end of a stream of articles in the reservoir. Examples of reservoirs of this type are disclosed in British patent specifications Nos. 1299174 and 2133759, and also in the Hierons U.S. Pat. No. 5,439,092 and the Brown et al U.S. Pat. No. 5,361,888, to which specifications and patents reference is directed in their entireties.

Reversible reservoirs are commonly referred to as first-in last-out devices, because the first articles to enter the device are the last articles to leave the device. Reservoirs for rod-like articles acting on a first-in first-out principle are also known, for example from European patent specification No. 581143A. One perceived advantage of first-in first-out reservoirs is that there is no possibility in normal operation of any articles remaining in the reservoir for an excessive period of time.

SUMMARY OF THE INVENTION

According to a first aspect of the present invention a reservoir system for rod-like articles comprises a delivery device, a receiving device, conveyor means extending between the delivery device and the receiving device including means for conveying a stream of said articles in multi-layer stack formation, variable capacity reservoir means linked to the conveyor means and capable of responding to imbalances in the rate of supply of articles from the delivery device and the demand for articles from the receiving device, and a control system including means for controlling reservoir unloading means so as to prevent any articles remaining in the reservoir for longer than a predetermined maximum time. The reservoir means may store articles in multi-layer stack formation on a conveyor, which may be reversible, or in containers.

According to another aspect of the invention a method of operating a reservoir system for rod-like articles in which a multi-layer stream of articles is reversibly conveyed between a storage region and a delivery conveyor, comprises monitoring the maximum time any articles can have remained in the reservoir, and initiating a reservoir emptying cycle when necessary so as to avoid occupation in the storage region by any articles in excess of a predetermined maximum time. In a preferred mode of operation the time at which and way in which a reservoir emptying cycle is initiated is controlled according to conditions in the system of which the reservoir forms a part. For example, where the reservoir is acting as a buffer reservoir in a conveyor system linking a delivery device (commonly a cigarette making machine) and a receiving device (commonly a cigarette packing machine) one or more of the following operational trends or conditions may be taken into account in an adaptive algorithm which determines when a drain cycle may be initiated:

(i) frequency and duration of stop of delivery device and of receiving device;
(ii) operational speeds of the delivery device and of the receiving device; and
(iii) historical level of fill of the reservoir.

In all cases the buffer reservoir must be completely emptied to ensure that no article remains after a drain cycle: in this way the maximum time of occupation of any article can be calculated from the last drain cycle.

In a typical system the buffer reservoir responds to temporary variations in the rates of operation of the delivery and receiving devices. In general, it is possible to overlay this "normal" operation of the buffer reservoir with the additional requirement that a drain cycle be periodically initiated without any excessive disruption of that normal operation: this is achieved by continuously monitoring conditions such as those listed above and arranging for the control algorithm (held in memory in a processor device) to take this into account. Typically the necessary drain cycle can be achieved by small adjustments of the speed of the delivery and/or receiving devices. Generally it is preferred to increase the speed of the receiving device where possible: decreasing the speed of the delivery device is also possible but this implies producing fewer articles than could theoretically be achieved and so results in a loss of measured efficiency.

By way of example, where the delivery device is a cigarette making machine operating at a speed of 14,000 cigarettes per minute (cpm) and the receiving device is a cigarette packing machine operating at a nominal speed of 700 packets (each containing 20 cigarettes) per minute, experience has shown that over an 8 hour shift a reversible reservoir having a maximum capacity of 130,000 cigarettes can be expected to reach each of a full and empty condition some 4 or 5 times with the delivery and receiving devices operating at a typical efficiency of about 85–90%. If it is assumed that the predetermined maximum time which it is required to have cigarettes remain in the reservoir is 4 hours, it will be seen that taking an average condition then the reservoir will reach an empty condition about every 2 hours: at that time a full drain cycle can be initiated ensuring that no cigarettes remain in the reservoir. Monitoring can then continue and no further full drain cycle is necessary for a further 4 hours (although if a reservoir empty condition occurs again after, say, 2 or 3 hours, then the control software may initiate a further drain cycle so as to avoid having to initiate a drain cycle later at a time possibly more disruptive to the normal operation of the reservoir). In other words, the conditions of the reservoir are monitored so as to provide drain cycles at suitable intervals and, whenever possible, with minimum disruption to the system (e.g. initiating drain cycles when the reservoir has reached a near empty condition through normal operation).

In order to avoid excessive disruption of the normal operation of the buffer reservoir, drain cycles may be initiated well in advance. For example, if a drain cycle is initiated with the system referred to in the previous paragraph and the reservoir is half full (i.e. containing 65,000 cigarettes), and if it assumed that the packing machine can be increased in speed by 25 packets/minute (equivalent to 500 cpm), then the time taken to drain the reservoir will be 65,000/500 minutes=2 hours 10 minutes. To this total time will need to be added a short time (say 1 minute) to fully purge the cigarettes from the reservoir (as explained later) so that the total drain time in this case would be 2 hours 11 minutes. It will be understood that this estimate represents an average condition: the exact time taken will depend on operating conditions and will, for example, be affected by slight variations in speeds of the making or packing machines and/or by any interruptions in operation of either machine.

Where the reservoir is linked to a packing machine which offers variable speed control (or speed control in a series of small incremental steps) then it is convenient for a drain cycle to be commenced at a predetermined level of fill of the reservoir, e.g. half full. Under these conditions the packing machine will always run slightly faster than the making machine and the reservoir capacity will only exceed half full if the packing machine stops. The excess speed at which the packer runs relative to the maker will be varied so as to achieve drainage of the reservoir within the predetermined maximum time. If the packing machine stops for an extended period, so resulting in the reservoir moving towards a full state, then in order to achieve a drain cycle it may be necessary to slow or even stop the maker. In the worst case, where the reservoir is full (e.g. containing 130,000 cigarettes) and assuming a maximum packer speed of 14,500 cpm, the drainage time would be about 9 minutes.

In controlling the initiation of the drain cycle the control system provided for performing the method of the present invention typically monitors system conditions and may record that information (e.g. relating to stoppages etc. of the delivery and/or receiving devices and levels of fill of the reservoir against time). Such information may be used additionally for assessing performance of the system and for controlling it, e.g. by adjustment of the speeds of the delivery and receiving devices for optimising performance. The fact that the control system of the invention automatically provides this additional information may therefore provide the user with the incidental benefit of greater operational flexibility.

The control system allows trend analysis of the machine to which the reservoir is linked. For example, the capacity of the reservoir can be used as an indication of the maker/packer balance, so that the speed of the packer can be more closely matched to that of the maker so that an optimum and reasonably constant state of fill of the reservoir can be obtained. Thus, if the reservoir is continuously tending to fill the speed of the packer can be reduced slightly so that the speeds of the maker and packer are better matched.

According to still another aspect of the invention a reservoir system is provided for carrying out the method of the invention, comprising a delivery device, a receiving device, conveyor means for conveying a stream of articles from the delivery device to the receiving device, a reversible reservoir linked to the conveyor means and capable of responding to imbalances in the rate of supply of articles from the delivery device and the demand for articles from the receiving device, so as to receive articles from the conveyor means or return articles to the conveyor means, and a control system including means for initiating a drain cycle so as to prevent any articles remaining in the reservoir for longer than a predetermined maximum time. In a preferred arrangement the reservoir cooperates with a smaller subsidiary reservoir to ensure that all articles are removed from the main reservoir during a drain cycle. The subsidiary reservoir may act in two ways: (i) it can fill to allow the last articles in the main reservoir to be removed irrespective of conditions prevailing in the system at the time, and (ii) it subsequently empties to ensure a flow of articles away from the junction at which the main reservoir connects to the conveyor means, thereby ensuring that all articles removed from the main reservoir flow away to the receiving device and are not returned to the main reservoir when it starts refilling. This subsequent emptying of the subsidiary reservoir and the consequent flow of articles through the junction completes the "purging" of the cigarettes from the main reservoir, referred to earlier.

According to a further aspect of the invention a reservoir system for rod-like articles comprises a delivery device, a receiving device, and conveyor means for conveying a multi-layer stream of articles from the delivery device towards the receiving device, said conveyor means including a junction at which articles may be received from or delivered to a variable capacity reservoir, wherein the conveyor means includes a variable length portion between said delivery device and said junction. Said variable-length portion may constitute a first-in first-out buffer reservoir and in a preferred arrangement comprises a portion of conveyor passing around laterally-movable guide means, substantially similar to that disclosed in the Brown et al U.S. Pat. No. 5,361,888. In a preferred system the reversible reservoir is itself similar to that disclosed in British patent specification No. 1299174 or said Brown et al U.S. Pat. No. 5,361,888. Although the buffer reservoir is located upstream of the junction at which the stream from the reversible reservoir joins the conveyor means, said buffer reservoir can perform the same function as the wheel 8 in the system of said Brown et al U.S. Pat. No. 5,361,888, i.e. that of preventing the imposition of high accelerations and/or excessive or unnecessary movement of the reversible reservoir.

According to a still further aspect of the invention a reservoir system for rod-like articles comprises a delivery device, a receiving device, and conveying means for conveying articles in multi-layer stack formation between the delivery device and the receiving device, wherein the conveying means includes means for loading successive leading portions of the stream into containers, means for conveying containers, and means for unloading containers so that successively unloaded portions of said stream are reformed into a continuous stream for onward conveyance to the receiving device, wherein monitoring means is provided to control said container conveying means so that containers may be unloaded in a predetermined or controlled order, e.g. in the order in which they are loaded. Hence, the controlling means may ensure that the container conveying means, which may contain a variable number of containers, acts as a variable-capacity first-in first-out reservoir. Alternatively, the monitoring means may simply ensure that no portions of the stream remain in containers for longer than a predetermined maximum time. To facilitate this each container may carry means capable of identifying its time of loading and the container conveying means and/or container unloading means may include means for ensuring that containers are unloaded in the correct order and/or no container carrying articles which have remained in the container for an excessive period of time are unloaded. A system and means for achieving this, such as provision of a programmable tag on each container, are disclosed in British patent specification No. 2188601A, to which reference is directed for details.

According to a still further aspect of the invention a reservoir system for rod-like articles comprises a delivery device, a receiving device, and conveyor means for conveying a multi-layer stream of articles from the delivery device towards the receiving device, wherein the conveying means comprises a variable-capacity first-in first-out reservoir including a conveyor extending in a generally helical path around laterally-spaced sets of guide means, each set of guide means comprising vertically-spaced guide elements, at least one of said guide means being movable towards and away from the other guide means so as to vary the capacity of the reservoir. In a preferred arrangement said at least one set of guide means comprises a series of vertically-spaced arcuate guide elements, the other set of guide means comprising vertically-spaced wheels.

The different aspects of the invention herein may be combined in any combination, and in particular any of the reservoir systems referred to herein may be operated in accordance with the methods referred to herein.

BRIEF DESCRIPTION OF THE DRAWINGS

Reference is hereinafter made, by way of example only, to the accompanying diagrammatic drawings, in which:

FIG. 8 is a plan view of part of a further cigarette making and packing system;

FIG. 9 is a side view of the system of FIG. 8;

DESCRIPTION OF THE PREFERRED EMBODIMENTS

Figure 1:
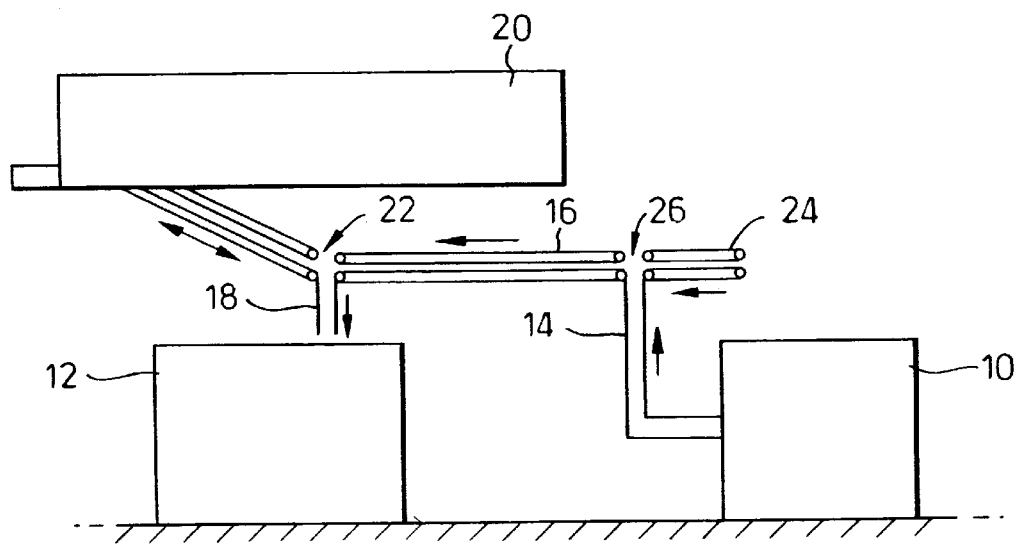
FIG. 1 shows a cigarette making and packing system.

In FIG. 1, a cigarette making machine 10 is linked to a cigarette packing machine 12 by a conveyor system including an elevator 14, horizontal conveyor 16 and downdrop 18. A relatively large capacity reversible reservoir 20 is connected to the conveyor 16 and downdrop 18 at a junction 22. The reservoir 20 may be of the type disclosed in said Brown et al U.S. Pat. No. 5,361,888. A relatively small capacity reversible reservoir 24 is connected to the elevator 14 and conveyor 16 at a further junction 26. The capacity of the reservoir 20 may typically be 130,000 cigarettes, that of the reservoir 24 typically, say, 2,000 cigarettes.

Figure 2:
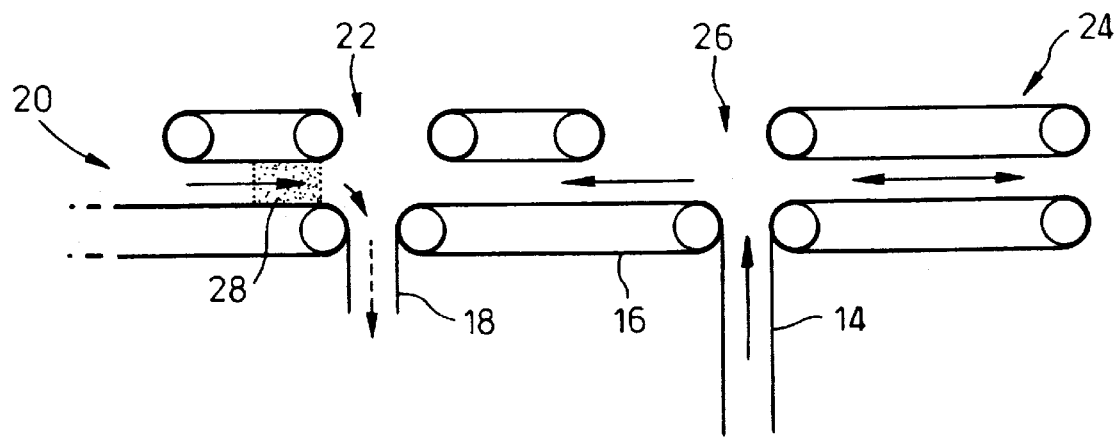
FIG. 2 shows in more detail the conveyors of the system of FIG. 1.

As shown in FIG. 2 the reservoir 20 has an end wall 28 for bounding the leading end of a stream of cigarettes extending into the reservoir. The end wall 28 may comprise a flexible element intended to be conveyed with the conveyor of the reservoir 20 and capable of extending right up to the junction 22. Thus, after a drain cycle has been completed the end wall 28 has advanced almost to the junction 22 (as shown in FIG. 2). During advancement of the end wall 28 to this position the small reservoir 24 will have absorbed some cigarettes. After the end wall 28 has reached its stop position the reservoir 24 will partially empty, thereby ensuring flow of all cigarettes in the region of the junction 22 down into the downdrop 18. Subsequently the reservoir 24 is driven to an empty condition (its normal condition) to initiate movement of the end wall 28 into the main reservoir 20. Normal operation of the system now recommences, with the control system software ensuring that the reservoir 20 is refilled to a preferred capacity (say half full) as far as operating conditions allow, so that the reservoir can provide protection for temporary speed imbalances of both the making machine 10 and the packing machine 12.

The small reservoir 24 may be replaced by a buffer reservoir positioned at any convenient location communicating with the cigarette flow to and from the main reservoir 20. The form of the small reservoir 24 may differ from that shown: for example a reservoir similar to that disclosed in British patent specification No. 2163717 may be employed.

Figure 3:
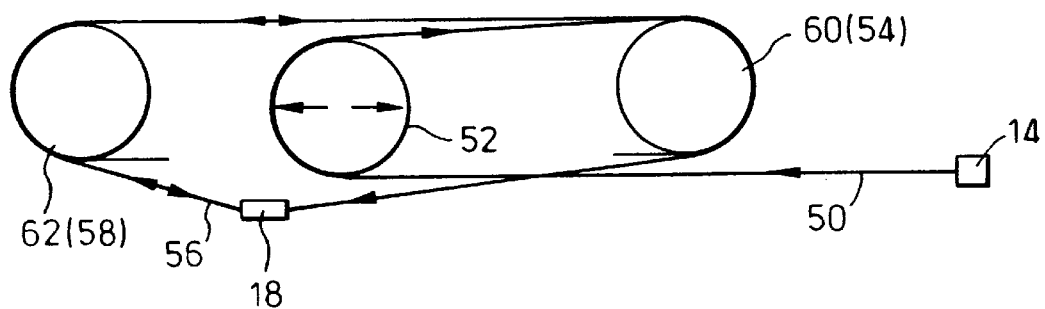
FIG. 3 is a plan view of part of another cigarette making and packing system.
Figure 4:
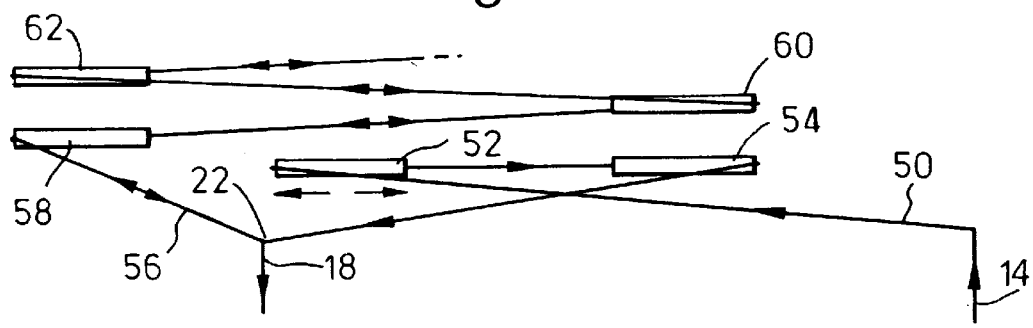
FIG. 4 is a side view of the system shown in FIG. 3.

The system shown in FIG. 3 and 4 includes an elevator 14 leading from a cigarette making machine (not shown) and a downdrop 18 leading to a packing machine (not shown). A conveyor 50 conveying a multi-layer stream extends from the elevator 14 and passes around first and second wheels 52, 54 and then to the junction 22 with the packer downdrop 18. A reversible conveyor 56 extends in the other direction from the junction 22 and passes to a further wheel 58 and then in a generally helical path around wheels 60, 62, etc, in a manner generally similar to that disclosed in British patent specification No. 1299174 or in the Brown et al U.S. Pat. No. 5,361,888.

The wheel 52 is movable in a generally horizontal direction, so as to lengthen or shorten the path of the conveyor 50 upstream of the junction 22. In this way a first-in first-out variable capacity reservoir is provided in the path to the packer downdrop 18. Movement of the wheel 52 may be achieved in a manner analogous to movement of the wheel 8 in the system disclosed in said Brown et al U.S. No. Pat. 5,361,888.

Note that the lower most wheel 58 of the reversible reservoir formed by the conveyor 56 is not movable back and forth as is the wheel 8 in said Brown et al U.S. Pat. No. 5,361,888: however, movement of the wheel 52 is capable of performing the same function, i.e. prevention of excessive acceleration or too frequent movement of the conveyor 56 of the main reversible reservoir, and in addition performs the function of the small capacity reversible reservoir 24 in the system of FIG. 1.

Total movement of the wheel 52 may be up to about 2 metres, corresponding to a difference in capacity between its extreme positions of about 5,000 cigarettes.

All of the control features described with reference to the system of FIGS. 1 and 2 may similarly be applied to the system described with reference to FIGS. 3 and 4.

Figure 5:
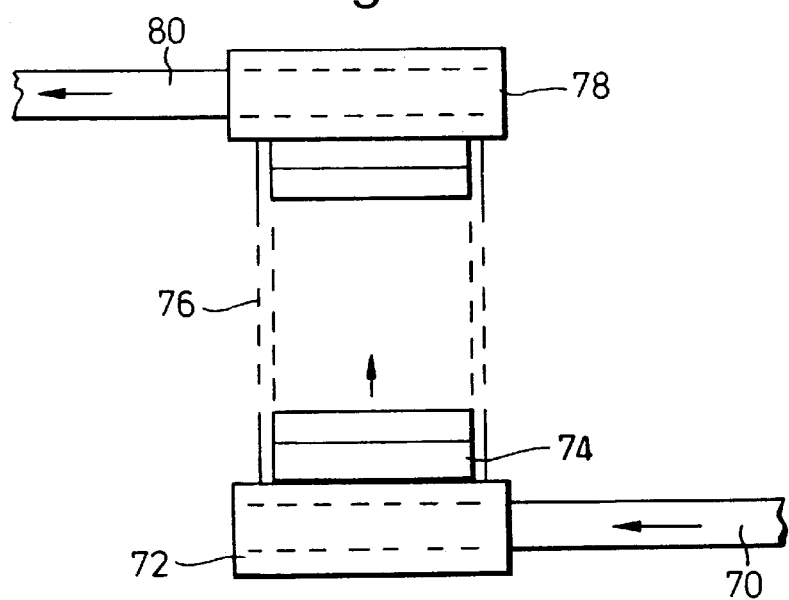
FIG. 5 is a plan view of part of a still further cigarette making and packing system.

FIG. 5 shows a further system, in which a stream of cigarettes in mass flow formation is conveyed from a making machine (not shown) on a conveyor 70 to a loading unit 72 at which successive leading portions of the mass flow stream are loaded into one or more containers or trays 74 which are transported along a path 76 to an unloading unit 78 at which said portions are recombined to form a mass flow stream which is conveyed to a packing machine (not shown) by way of a further conveyor 80. The form of the loading unit 72 and unloading unit 78 may be similar to that disclosed in British patent specification No. 1404141, to which reference is directed for details.

The system of FIG. 5 is controlled such that trays 74 are unloaded according to predetermined requirements, e.g. in the same order as that in which they are loaded, i.e. so that the path 76 (which may be other than a simple conveyor as indicated) acts as a variable capacity first-in first-out reservoir for the stream passing from the making machine to the packing machine. In order to achieve this each tray 74 may carry a programmable tag or other device capable of recording time of loading at the unit 72. Thus the unit 72 may include a write device and unit 78 a read device to facilitate control as required.

The system shown in FIGS. 8 and 9 has substantial similarities with that of FIG. 5 and extends between a cigarette making machine 200 and a cigarette packing machine 202. A mass flow conveyor 204, which includes an elevator 206, extends between the machines 200 and 202 and conveys a continuous stream of cigarettes in multi-layer stack formation. A container loading unit 208 is located adjacent to the conveyor 204 and serves to load cigarettes from the conveyor 204 into containers 224 when required. Containers carrying cigarettes are transported from the loading unit 208 towards a container unloading unit 210 by means of a container transport unit 212. Cigarettes unloaded from containers at the unloading unit 210 are reformed into a continuous mass flow stream on a conveyor 214 which extends to a junction 216 with the conveyor 204 at the top of the elevator 206. The conveyor 214 includes an elevator 218 and a portion 220 having an S-shape in plan.

Figure 10:
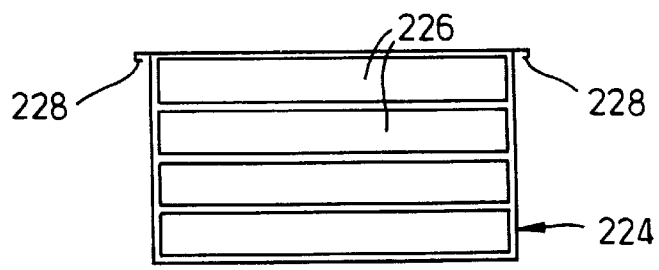
FIG. 10 is a side view of a container usable in the systems of FIG. 5 and FIG. 8.

As shown particularly in FIG. 10, each container 224 comprises four compartments 226, each capable of holding a stack of cigarettes having the same height as the stream on conveyor 204. Typically each compartment 226 may hold about 1250 cigarettes. Each container 224 has side ledges 228 at its upper corners, from which the containers may be suspended on rails (not shown) in the transporting unit 212. The trays 74 used in the system of FIG. 5 may be similar to the containers 224.

The form of the loading unit 208 and unloading unit 210 may be similar to that disclosed in British patent specification No. 1404141, to which reference is directed for details. Thus, compared with that system, the system shown in FIGS. 8 and 9 of the present application differs in that not all of the cigarettes flowing from the making machine 200 are loaded into containers, although that mode of operation would be possible and for such purpose a closable gate 215 is provided to extend across the top of the elevator 206 at the junction 216. The gate 215 may be similar to that disclosed in British patent specification No. 2157253, to which reference is directed for details.

As indicated diagrammatically in the drawing, the loading unit 208 receives batches of cigarettes directly from the conveyor 204. Alternatively, the loading unit 208 could operate from a conveyor 222 which branches from the main conveyor 204. In this way it would not be necessary to insert dividers of the type disclosed in said specification No. 1404141 into the stream of cigarettes on the main conveyor 204.

Operation of the system shown in FIGS. 8 and 9 is similar to that of the system of FIG. 5 except that generally the majority of cigarettes produced by the making machine 200 pass directly to the packing machine 202 by way of the direct path along conveyor 204. Cigarettes are only loaded into containers at the loading unit 208 when the production of the making machine 200 exceeds the requirements of the packing machine 202. Similarly, cigarettes are unloaded from containers at the unloading unit 210 when the requirements of the packing machine 202 exceed the production at the making machine 200. In addition, the system is controlled such that containers are unloaded according to predetermined requirements, e.g. in the same order as that in which they are loaded, i.e. so that the transport unit 212 for containers acts as a variable capacity first-in first-out reservoir. In order to achieve this each container may carry a programmable tag or other device capable of recording time of loading at the unit 208. Thus, the unit 208 may include a write device and the unit 210 a read device to facilitate control as required. Furthermore, the system may operate such that containers are automatically unloaded at the unit 210 a predetermined time after loading or production: in this way no cigarettes should remain unpacked for an excessive period. Reference is directed to said British patent specification No. 2188601A for further details of provision of write and read devices in a container system for rod-like articles.

Figure 6:
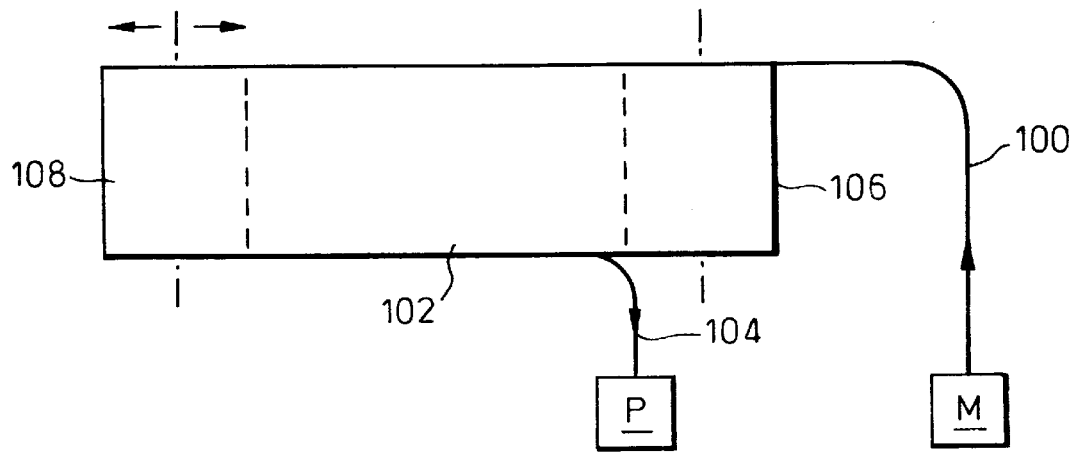
FIG. 6 is a side view of part of a still further cigarette making and packing system.
Figure 7:
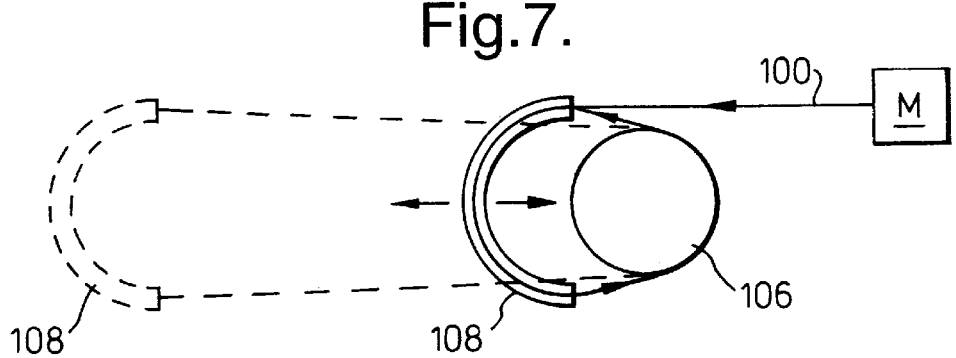
FIG. 7 is a plan view of the system of FIG. 6.

FIGS. 6 and 7 show a still further system, in which a mass flow stream of cigarettes passes from a making machine M to an elevating conveyor 100 which leads the stream to a first-in first-out reservoir 102, from which an output stream is delivered to a downdrop 104 and packing machine P. The reservoir 102 comprises a reservoir conveyor extending downwards in a generally helical path passing round horizontally spaced sets of guide members 106, 108. The guide members 106 comprise vertically spaced wheels, similar to those used in said specification No. 1299174 and in the Brown et al U.S. Pat. No. 5,361,888. The guide members 108 could also comprise wheels but preferably comprise arcuate guides around which the conveyor passes. The vertically spaced guide members 108 are movable towards and away from the wheels 106, as indicated in the drawings, to vary the capacity of the reservoir 102. The advantage of using curved guide members 108 for the movable part of the reservoir is apparent from FIG. 7, from which it is clear that the minimum capacity of the reservoir can be lower with such an arrangement because the arcuate guides can approach the wheels 106 more closely.

Figure 11:
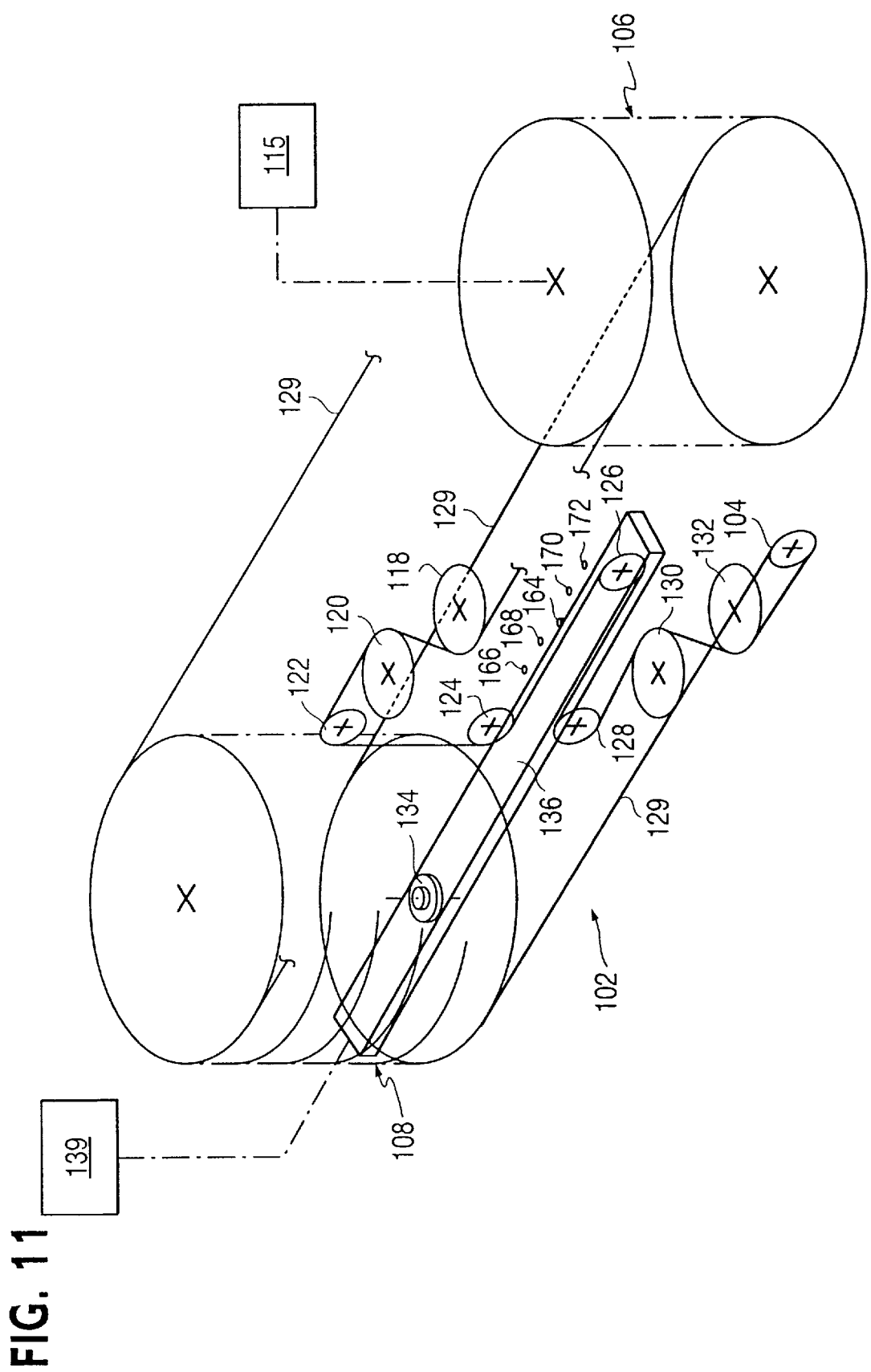
FIG. 11 is a perspective schematic view of a gathering and tensioning arrangement for use in the system of FIG. 6.
Figure 12:
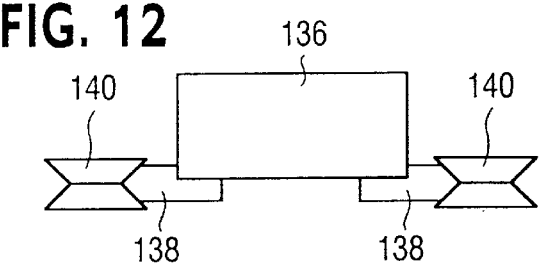
FIG. 12 is a cross-sectional view of a support beam of the reservoir system of FIG. 11.

As with the system of FIGS. 3 and 4 a tensioning and gathering means is provided for maintaining tension in the reservoir conveyor and for gathering excess conveyor as necessary when the reservoir is in other than its maximum capacity conditions. Such tensioning and gathering means may be similar to that disclosed in said Brown et al U.S. Pat. No. 5,361,888. More specifically, as seen in FIG. 11 (FIG. 1 of the Brown et al U.S. Pat. No. 5,361,888), the guide members 108 are mounted on a vertical spindle 134 which is carried by a rigid beam 136. The beam 136 is movable in a direction parallel to its length and, as shown in FIG. 12, for this purpose carries mountings 138 which cooperate with V-rollers 140 (not shown in FIG. 11). The mountings 138 and rollers 140 effectively form a slide for the beam 136: suitable components are available from Hepco Slide Systems Ltd of Greenford, Middlesex, UB6 7LA. Drive means (indicated at 139) is provided for moving and positioning the beam 136 relative to the rollers 140. Suitable forms of drive means are a rack and pinion, timing belt or recirculating ball.

The beam 136 is movable through a range of positions and carries a projection 164 which cooperates with a series of stationary proximity detectors 166, 168, 170 and 172, which span the range and are connected to the reservoir control system. In the position shown in FIG. 11, the beam 136 is in the center of this range, with the axis 134 in axial alignment with the radial center of the vertically spaced guide members 108.

Figure 13:
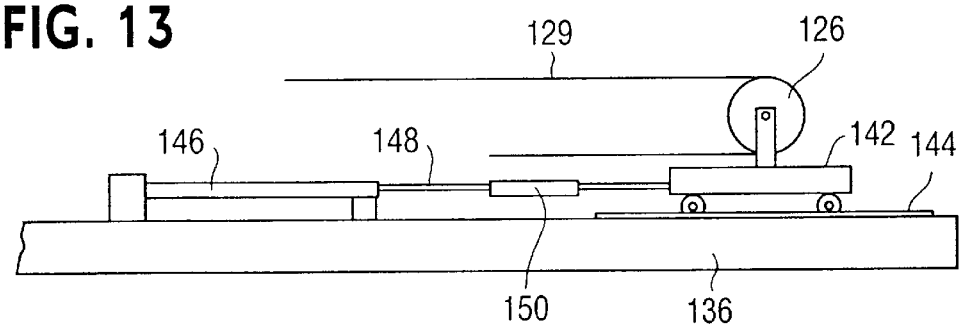
FIG. 13 is an elevation of a part of the reservoir system of FIG. 11, showing the support beam.

As indicated in FIG. 11 and shown more particularly in FIG. 13, the beam 136 carries a pulley 126 in the return run of conveyor 129. Movement of the beam 136 in a direction to the left as shown in FIG. 11 results in an additional length of conveyor 129 being drawn into the operative run of the conveyor, because the lengths of the runs from pulley 126 to guide member 108 and from guide member 108 to wheels 106 are increased by the distance moved by the beam. This additional length is withdrawn from the return run of conveyor 129 by corresponding movement of the pulley 126 reducing the lengths of the runs between pulleys 124 and 126 and pulleys 126 and 128 by the distance traveled by the beam 136. Similarly, movement of the beam 136 in a direction to the right as shown in FIG. 11 causes a reduction in the length of the operative run of conveyor 129 which is compensated for by an increase in the length of the return run of the conveyor.

The axis of the pulley 126 is normally held in a fixed position relative to the beam 136. However, from time to time the conveyor 129 will require adjustment of its tension, particularly to compensate for length increases due to stretching. A convenient arrangement for achieving tension adjustment of the conveyor 129 is by movement of the position of the pulley 126 relative to the beam 136. As shown in FIG. 13, the pulley 126 is mounted on a carriage 142 which is movable along a track 144 mounted on the beam 136. The position of the carriage 142 on the track 144 is determined by a linear actuator 146 mounted on the beam 136. The linear actuator 146 is connected to the carriage 142 by an actuating rod 148 containing a linear transducer 150 which provides an output of the compressive force applied by the rod 148 to the carriage 142: this is effectively a measure of the tension applied to the conveyor 129 by the pulley 126. By linking the output from the linear transducer 150 to a PLC-controlled system which includes the linear actuator 146, it is thus possible to preset the required tension in the conveyor 129. Moreover, the transducer 150 can be arranged to supply a signal to the control system indicative of the position of the carriage. In this way, the system is capable of storing and suitably displaying (e.g. on a monitor) the position of the carriage in relation to its limits of travel, so that warning may be given when the conveyor 129 needs to be shortened (e.g. due to excessive stretching) by removal of links or otherwise. At times other than when tension adjustment is being made, the position of pulley 126 relative to the beam 136 is fixed (e.g. by clamping the carriage 142 to the beam).

It will be appreciated that movement of the pulley 126 (or equivalent) to compensate for movement of the guide members 108 may be achieved in ways other than that shown in the drawings. Thus, the pulley 126 need not be mounted on a common beam 136 but could be separately moved by means synchronized with the drive means for translating the guide members 108. In this case each may derive their movement from a common drive, e.g. operating through timing belts and a transmission (possibly including a clutch to allow independent movement of the pulley 126 and guide members 108 for tension adjustment of the conveyor 129). Another possibility would be to provide for movement of the guide members 108 to be compensated for by movement in the opposite direction of another of the reservoir wheels. Thus, respective ones of the vertically spaced guide members 108 could be moved together in opposite directions by a rack and pinion or similar device arranged between the wheels. Such arrangements are necessarily more complex than the illustrated arrangement.

Figure 14:
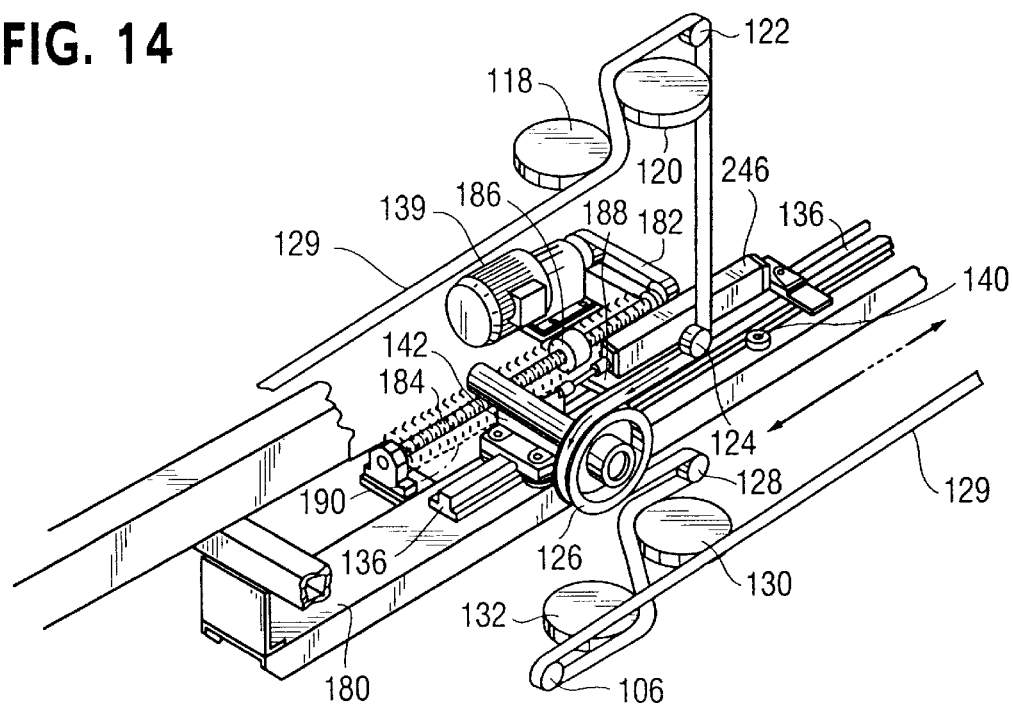
FIG. 14 is a perspective view of another version of the gathering and tensioning arrangement for use in the system of FIG. 6.

FIG. 14 shows another version of the gathering and tensioning arrangement for use in the reservoir system of FIG. 6, and similar parts therein have been given similar reference numbers.

The V-rollers 140 which support the beam 136 and allow it to move longitudinally are themselves mounted on a stationary frame member 180.

The motor 139 for moving the beam 136 drives a timing belt 182, which in turn rotates a threaded rod 184. A follower member 186 engaging the threaded rod 184 is connected by way of a bracket 188 to the beam 136. The threaded rod 184 and follower 186 are enclosed in a protective rubber gaiter 190. The linear actuator 146 of FIG. 13 is replaced by a double acting pneumatic piston and cylinder 246, capable of setting and maintaining the position of the carriage 142. A mechanical latch (not shown) acting between the carriage 142 and the beam 136 resists undesired movement of the carriage in the direction towards the cylinder 246. The latch is automatically released when the piston and cylinder 246 is operated to move the carriage 142.

What is claimed is:

1. A reservoir system for rod-like articles, comprising a delivery device, a receiving device, and conveyor means for conveying a multi-layer stream of articles from the delivery device towards the receiving device, wherein the conveying means comprises a variable-capacity first-in first-out reservoir including a conveyor extending in a generally helical path around laterally-spaced sets of guide means, each set of guide means comprising vertically-spaced guide elements, at least one of said guide means being movable towards and away from another of said guide means in another of said sets so as to vary the capacity of the reservoir, said conveyor having an operative run extending between a reservoir input at a first level and a reservoir output at a second level, said helical path extending undirectionally from said input to said output between said first and second levels.

2. A reservoir system as claimed in claim 1, wherein said conveyor is endless, further including gathering means for gathering a portion of said conveyor not on said helical path, said gathering means including further guide means, said movable guide means and said further guide means being arranged for movement together when the capacity of the reservoir is varied.

3. A reservoir system as claimed in claim 1, wherein said reservoir input is at a level above the level of said delivery device, and said conveyor means further includes an elevating conveyor portion for conveying said articles from the level of said delivery device to the level of said reservoir inlet.

4. A reservoir system for rod-like articles, comprising a delivery device, a receiving device, and conveyor means for conveying a multi-layer stream of articles from the delivery device towards the receiving device, wherein the conveying means comprises a variable-capacity first-in first-out reservoir including a conveyor extending in a generally helical path around laterally-spaced sets of guide means, each set of guide means comprising vertically-spaced guide elements, at least one of said guide means being movable towards and away from another of said guide means in another of said sets so as to vary the capacity of the reservoir, said conveyor having an operative run extending between a reservoir input at a first level and a reservoir output at a second level, said helical path extending from said input to said output between said first and second levels, wherein said conveyor is endless, further including gathering means for gathering a portion of said conveyor not on said helical path, said gathering means including further guide means, said-movable guide means and said further guide means being arranged for movement together when the capacity of the reservoir is varied, wherein said gathering means includes means for guiding said conveyor into at least one loop whose length is varied with movement of said further guide means.

5. A reservoir system as claimed in claim 4, wherein at least a part of said loop is disposed in a space defined by said helical path as seen from above the reservoir.

6. A reservoir system as claimed in claim 4, wherein said further guide means is mounted for movement along a linear path which is disposed within a space defined by said helical path as seen from above the reservoir.

7. A reservoir system as claimed in claim 4, wherein said means for guiding said conveyor forms a loop of variable length which extends in a plane parallel to an axis of said helical path.

8. A reservoir system for rod-like articles, comprising a delivery device, a receiving device, and conveyor means for conveying a multi-layer stream of articles from the delivery device towards the receiving device, wherein the conveying means comprises a variable-capacity first-in first-out reservoir including a conveyor extending in a generally helical path around laterally-spaced sets of guide means, each set of guide means comprising vertically-spaced guide elements, at least one of said guide means being movable towards and away from another of said guide means in another of said sets so as to vary the capacity of the reservoir, wherein said conveyor is endless, further including gathering means for a portion of said conveyor not on said helical path, said gathering means including further guide means, said movable guide means and said further guide means being arranged for movement together when the capacity of the reservoir is varied, wherein said gathering means includes means for guiding said conveyor into at least one loop whose length is varied with movement of said further guide means.

9. A reservoir system as claimed in claim 8, wherein said movable guide means and said further guide means are mounted on a common movable member.

10. A reservoir system as claimed in claim 9, wherein said gathering means further includes means for adjusting the distance between said guide means and said further guide means.

11. A reservoir system as claimed in claim 10, including means for controlling the tension of said conveyor, including means for resiliently mounting said further guide means relative to said common movable member.

12. A reservoir system as claimed in claim 8, wherein said reservoir inlet is at a level above the level of said delivery device, and said conveyor means further includes an elevating conveyor portion for conveying said articles from the level of said delivery device to the level of said reservoir inlet.

13. A reservoir system as claimed in claim 8, wherein at least a part of said loop is disposed in a space defined by said helical path as seen from above the reservoir.

14. A reservoir system as claimed in claim 8, wherein said further guide means is mounted for movement along a linear path which is disposed within a space defined by said helical path as seen from above the reservoir.

15. A reservoir system as claimed in claim 8, wherein said means for guiding said conveyor forms a loop of variable length which extends in a plane parallel to an axis of said helical path.

16. A reservoir system as claimed in claim 5, wherein said means for guiding said conveyor forms a loop of variable length which extends in a plane parallel to an axis of said helical path.

17. A reservoir system as claimed in claim 6, wherein said means for guiding said conveyor forms a loop of variable length which extends in a plane parallel to an axis of said helical path.

18. A reservoir system as claimed in claim 13, wherein said means for guiding said conveyor forms a loop of variable length which extends in a plane parallel to an axis of said helical path.

19. A reservoir system as claimed in claim 14, wherein said means for guiding said conveyor forms a loop of variable length which extends in a plane parallel to an axis of said helical path.

* * * * *